United States Patent
Antony et al.

(10) Patent No.: US 8,572,536 B2
(45) Date of Patent: Oct. 29, 2013

(54) SPARE LATCH DISTRIBUTION

(75) Inventors: George Antony, Kerala (IN); Sridhar H. Rangarajan, Bangalore (IN); Thomas E. Rosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 13/246,038

(22) Filed: Sep. 27, 2011

(65) Prior Publication Data
US 2013/0080989 A1 Mar. 28, 2013

(51) Int. Cl.
G06F 17/50 (2006.01)

(52) U.S. Cl.
USPC ........... 716/114; 716/110; 716/111; 716/132; 716/134

(58) Field of Classification Search
USPC ......................... 716/114, 110–111, 132, 134
See application file for complete search history.

(56) References Cited

U.S. PATENT DOCUMENTS

| | | | |
|---|---|---|---|
| 5,623,420 A | 4/1997 | Yee et al. | |
| 6,536,024 B1 * | 3/2003 | Hathaway | 327/295 |
| 7,430,725 B2 | 9/2008 | Broberg, III et al. | |
| 7,676,776 B2 | 3/2010 | Tsapepas et al. | |
| 2006/0036976 A1 * | 2/2006 | Cohn et al. | 716/4 |
| 2007/0186199 A1 * | 8/2007 | Fredrickson et al. | 716/7 |
| 2007/0234242 A1 * | 10/2007 | Inui et al. | 716/1 |
| 2008/0127018 A1 * | 5/2008 | Alpert et al. | 716/10 |
| 2008/0229265 A1 * | 9/2008 | Bueti et al. | 716/6 |
| 2008/0301614 A1 * | 12/2008 | St. Juste et al. | 716/11 |
| 2009/0193376 A1 * | 7/2009 | Alpert et al. | 716/9 |
| 2009/0193377 A1 * | 7/2009 | Puri et al. | 716/9 |
| 2009/0210832 A1 * | 8/2009 | Wood | 716/4 |
| 2009/0293035 A1 * | 11/2009 | Galbi et al. | 716/16 |
| 2010/0175038 A1 | 7/2010 | Hopkins et al. | |
| 2012/0054707 A1 * | 3/2012 | Goodman et al. | 716/119 |
| 2012/0066654 A1 * | 3/2012 | Hopkins et al. | 716/102 |
| 2012/0124541 A1 * | 5/2012 | Amundson et al. | 716/122 |

OTHER PUBLICATIONS

Dillinger et al., "Spare I/O Preparation for Use at Release Interface Tape B", IBM Technical Disclosure Bulletin, vol. 34, No. 10A, Mar. 1992, pp. 186-190.
Lasota et al., "A Method for Saving Clock Opted Logic During Physical Design", Jun. 1, 1998, 3 pages.
"Method and System for Placement of Spare Circuitry in and Integrated Circuit Design", Nov. 15, 2010, 7 pages.

* cited by examiner

*Primary Examiner* — Stacy Whitmore
(74) *Attorney, Agent, or Firm* — Richard M. kotulak; Hoffman Warnick LLC.

(57) ABSTRACT

Aspects of the invention provide for spare latch distribution for an integrated circuit design. In one embodiment, aspects of the invention include a method of generating a computer system for spare latch distribution in an integration circuit design, the method including: providing a computer system operable to: receive design data for the integrated circuit design, the design data including a plurality of latches; segment the integrated circuit design into a plurality of equal sections; determine a latch density within each of the equal sections; and determine a number of spare latches, based on the latch density, for each of the equal sections. Further, it is understood that the above are performed for each clock domain within the integrated circuit design.

11 Claims, 4 Drawing Sheets

SPARE LATCH DISTRIBUTION

BACKGROUND OF THE INVENTION

The subject matter disclosed herein relates generally to integrated circuits. More specifically, the disclosure provided herein relates to spare latch distribution for an integrated circuit design.

Typically, design changes come up in the final phase of the circuit design, which need to be implemented without affecting the processed sections. These changes are conventionally known as an engineering change order (ECO). In order to satisfy the need to implement these ECOs, spare circuitry is normally included in the circuit design. Spare latches are an example of this spare circuitry and are often used to implement the ECOs.

During the initial design phase, spare latches are not part of the data path, and so, latch clustering and placement give the spare latches the least priority. This leads to all spare latches to be pushed to the least dense region of the circuit. However, if the ECO is needed to adjust for timing issues, if the spare latch is not physically in close proximity to the region of the circuit that needs to utilize the spare latch, additional timing delays can accrue due to the distance between the latch and the region of the circuit.

BRIEF DESCRIPTION OF THE INVENTION

Aspects of the invention provide for spare latch distribution for an integrated circuit design. In one embodiment, aspects of the invention include a method of generating a computer system for spare latch distribution in an integration circuit design, the method comprising: providing a computer system operable to: receive design data for the integrated circuit design, the design data including a plurality of latches; segment the integrated circuit design into a plurality of equal sections; determine a latch density within each of the equal sections; and determine a number of spare latches, based on the latch density, for each of the equal sections. Further, it is understood that the above are performed for each clock domain within the integrated circuit design.

A first aspect of the invention provides a method of generating a computer system for spare latch distribution in an integration circuit design, the method comprising: providing a computer system operable to: receive design data for the integrated circuit design, the design data including a plurality of latches; segment the integrated circuit design into a plurality of equal sections; determine a latch density within each of the equal sections; and determine a number of spare latches, based on the latch density, for each of the equal sections.

A second aspect of the invention provides a non-transitory computer-readable medium, which when executed, enables a computer system to implement a method for spare latch distribution in an integrated circuit design, the method comprising: receiving design data for the integrated circuit design, the design data including a plurality of latches; segmenting the integrated circuit design into a plurality of equal sections; determining a latch density within each of the equal sections; and determining a number of spare latches, based on the latch density, for each of the equal sections.

A third aspect of the invention provides a computer system, comprising: at least one computing device configured for to perform spare latch distribution of an integrated circuit design by: receiving design data for the integrated circuit design, the design data including a plurality of latches; segmenting the integrated circuit design into a plurality of equal sections; determining a latch density within each of the equal sections; and determining a number of spare latches, based on the latch density, for each of the equal sections.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates generally to integrated circuits. More specifically, the disclosure provided herein relates to spare latch distribution for an integrated circuit design.

Typically, design changes come up in the final phase of the circuit design, which need to be implemented without affecting the processed sections. These changes are conventionally known as an engineering change order (ECO). In order to satisfy the need to implement these ECOs, spare circuitry is normally included in the circuit design. Spare latches are an example of this spare circuitry and are often used to implement the ECOs.

During the initial design phase, spare latches are not part of the data path, and so, latch clustering and placement give the spare latches the least priority. This leads to all spare latches to be pushed to the least dense region of the circuit. However, if the ECO is needed to adjust for timing issues, if the spare latch is not physically in close proximity to the region of the circuit that needs to utilize the spare latch, additional timing delays can accrue due to the distance between the latch and the region of the circuit.

Aspects of the invention provide for spare latch distribution for an integrated circuit design. In one embodiment, aspects of the invention include a method of generating a computer system for spare latch distribution in an integration circuit design, the method comprising: providing a computer system operable to: receiving design data for the integrated circuit design, the design data including a plurality of latches; segmenting the integrated circuit design into a plurality of equal sections; determining a latch density within each of the equal sections; and determining a number of spare latches, based on the latch density, for each of the equal sections. Further, it is understood that the following are performed for each clock domain within the integrated circuit design.

As indicated above, aspects of the invention provide for spare latch distribution for an integrated circuit design. As used herein, unless otherwise noted, the term "set" means one or more (i.e., at least one) and the phrase "any solution" means any now known or later developed solution.

Figure 1:
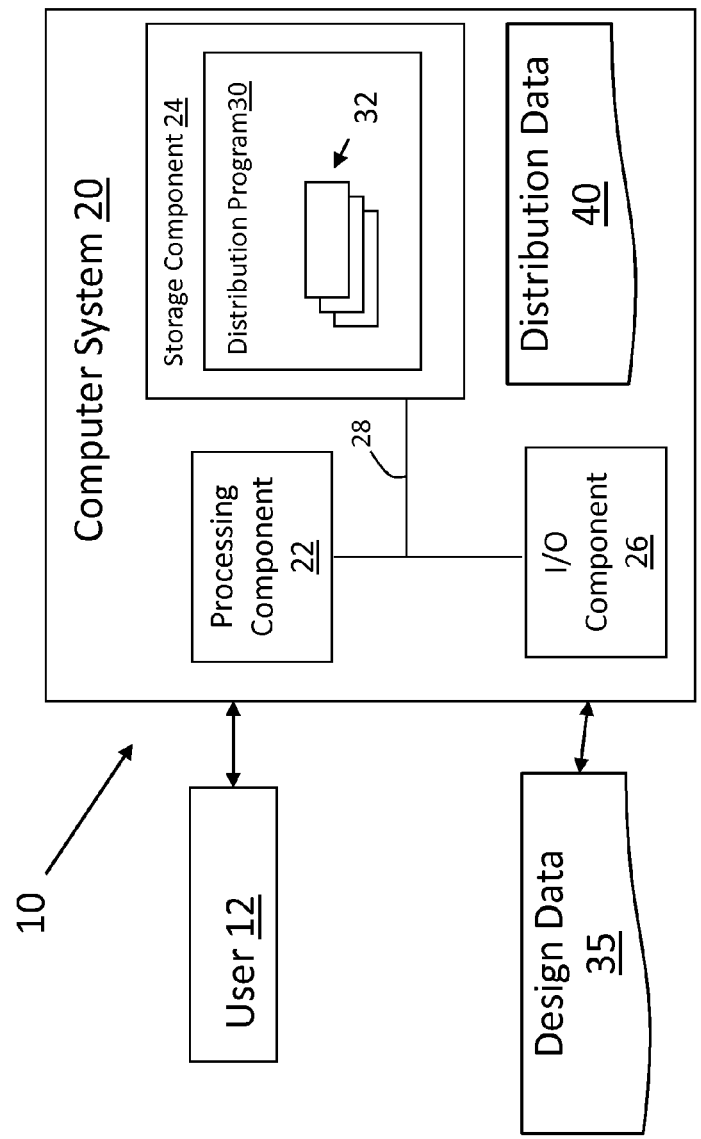
FIG. 1 shows a partial diagram of a conventional integrated circuit according to embodiments of the invention.

Turning to the drawings, FIG. 1 shows an illustrative environment 10 for spare latch distribution for an integrated circuit according to an embodiment. To this extent, environment 10 includes a computer system 20 that can perform a process described herein in order to perform spare latch distribution for an integrated circuit. In particular, computer system 20 is shown including a distribution program 30, which makes computer system 20 operable to perform spare latch distribution for an integrated circuit by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as distribution program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, distribution program 30 can manage a set of interfaces (e.g., graphical user interface(s), application program interface, and/or the like) that enable human and/or system users 12 to interact with distribution program 30. Further, distribution program 30 can manage (e.g., store, retrieve, create, manipulate, organize, present, etc.) the data, such as distribution data 40, using any solution.

In any event, computer system 20 can comprise one or more general purpose computing articles of manufacture (e.g., computing devices) capable of executing program code, such as distribution program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, distribution program 30 can be embodied as any combination of system software and/or application software.

Further, distribution program 30 can be implemented using a set of modules 32. In this case, a module 32 can enable computer system 20 to perform a set of tasks used by distribution program 30, and can be separately developed and/or implemented apart from other portions of distribution program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of distribution program 30 fixed thereon (e.g., one or more modules 32). However, it is understood that computer system 20 and distribution program 30 are only representative of various possible equivalent computer systems that may perform a process described herein. To this extent, in other embodiments, the functionality provided by computer system 20 and distribution program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, distribution program 30 enables computer system 20 to perform spare latch distribution for an integrated circuit. To this extent, computer system 20 may perform the method according to aspects of the invention, as shown in FIG. 2.

Figure 2:
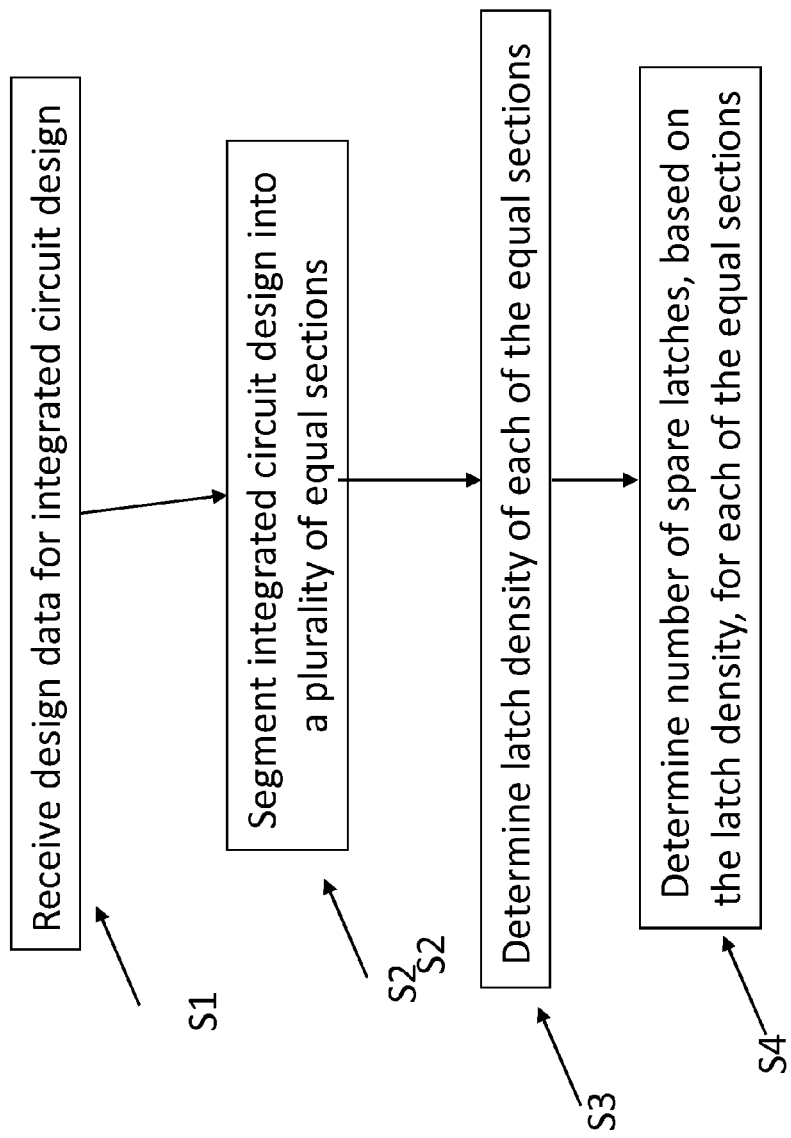
FIG. 2 depicts an illustrative process flow diagram according to embodiments.
Figure 3:
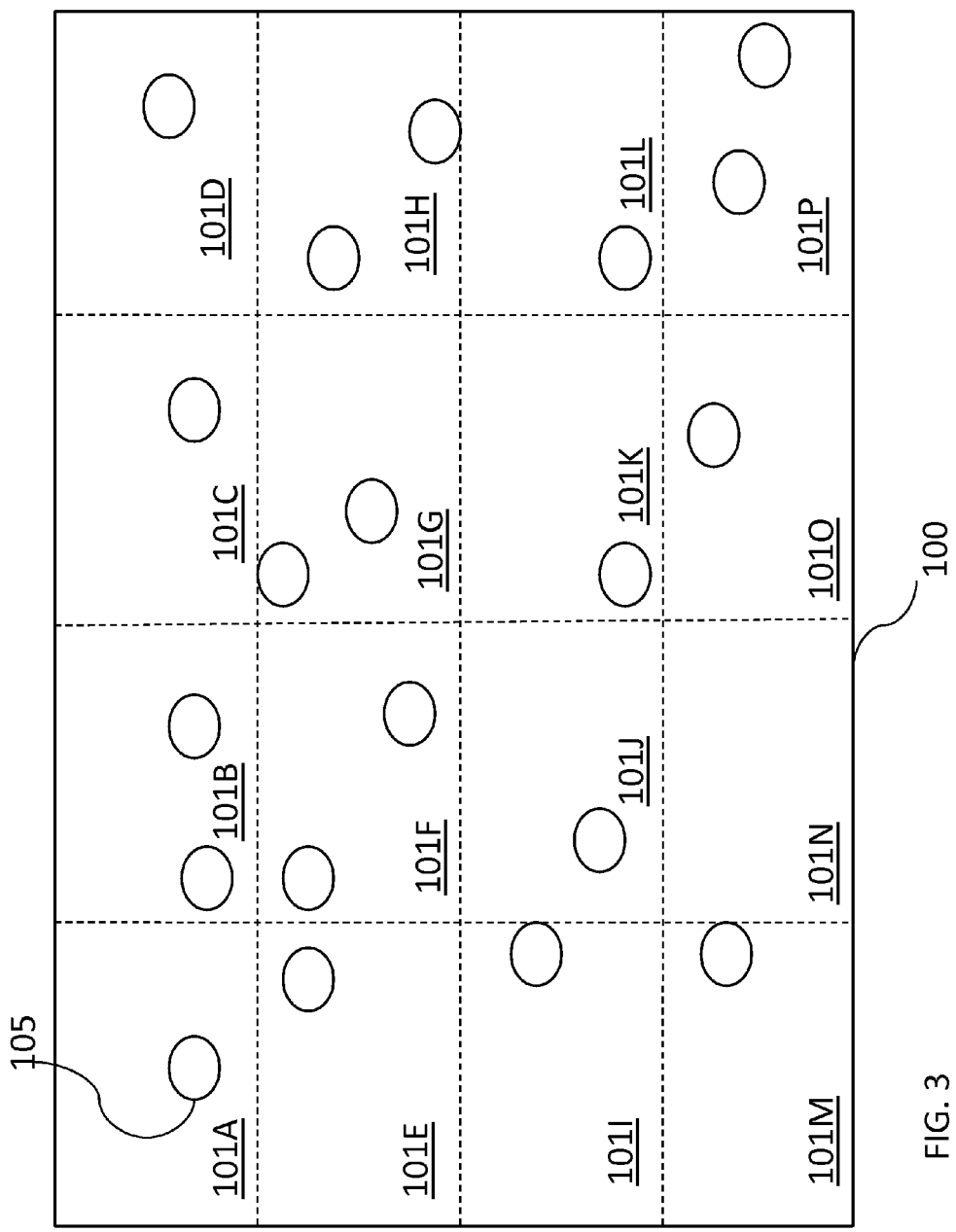
FIG. 3 depicts an illustrative segmentation of an integrated circuit design according to embodiments.
Figure 4:
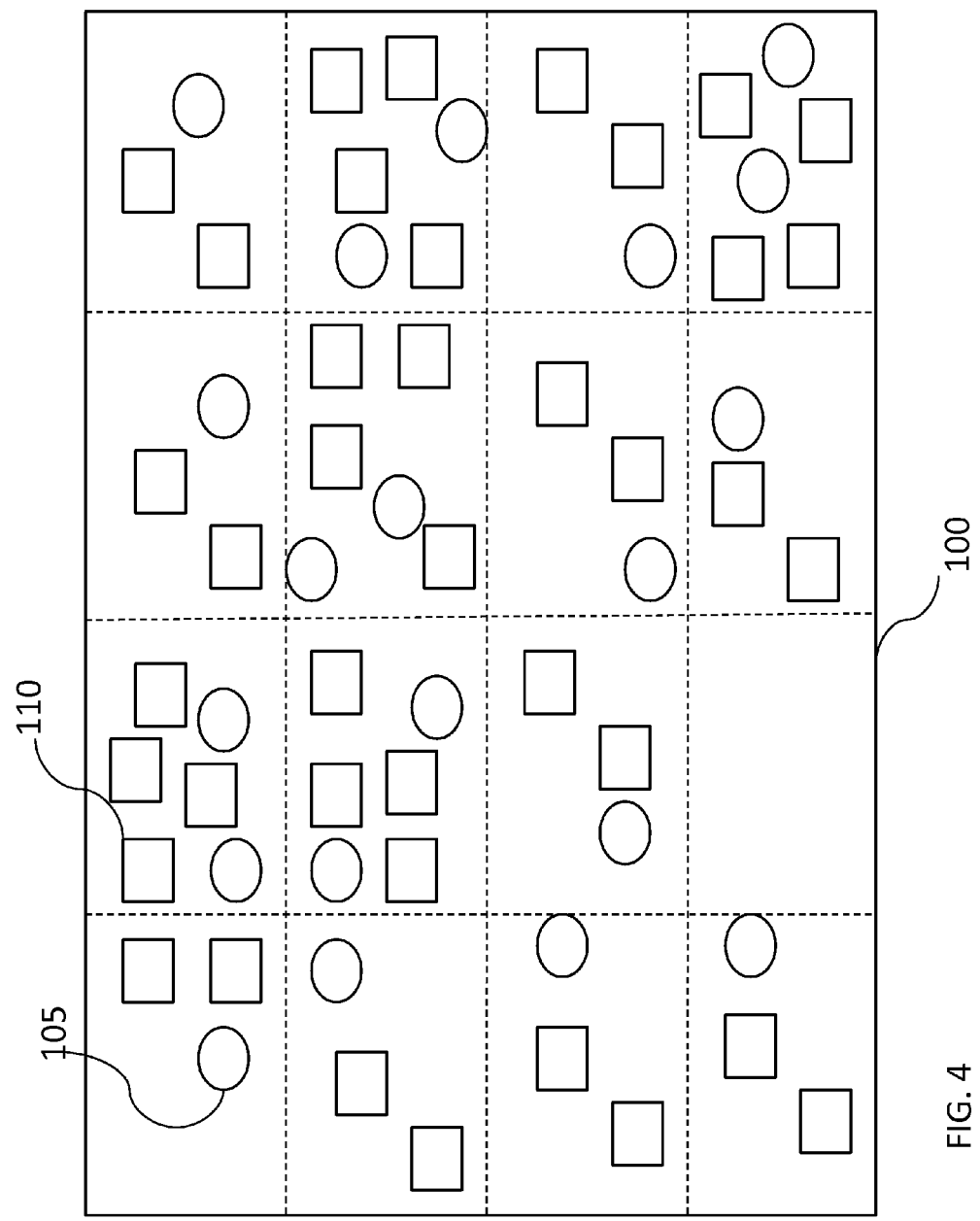
FIG. 4 depicts an illustrative integrated circuit design according to embodiments.

Referring now to FIG. 2, and with reference to FIGS. 1 and 3-4, at step S1, design data 35 is received by the computer system 20. The design data 35 is for an integrated circuit design 100 and includes information regarding the placement of a plurality of latches on the integrated circuit design. Next, at step S2, the integrated circuit design 100 is segmented into a plurality of equal sections 101A, 101B, . . . , 101P. Although FIG. 3 shows that integrated circuit design 100 is segmented into 16 (A-P) equal sections, it is understood that the integrated circuit design 100 may be segmented into any number of equal sections. Further, it is understood that the following are performed for each clock domain within the integrated circuit design 100. The integrated circuit design 100 may include any number of clock domains. That is, the integrated circuit design 100 may be segmented for each of the clock domains.

Next, at step S3, a latch density within each of the equal sections 101A, 101B, . . . 101P is determined by distribution program 30 of computer system 20. The latch density ($l_i$) within each of the equal sections 101A may be determined by dividing the number of latches ($n_i$) within each of the equal sections 101A, 101B, . . . 101P by the total number of latches (N) within each of the equal sections 101A, 101B, . . . 101P. That is, $l_i=n_i/N$. In the example shown in FIG. 3, section 101A of the integrated circuit design 100 includes 1 latch. The total number of latches within the integrated circuit design 100 is 20 latches. Therefore, the latch density of section 101A of the integrated circuit design 100 is 1/20.

At step S4, the number ($s_i$) of spare latches (i.e., the distribution data 40) that indicates how many spare latches to place within each of the equal sections 101A, 101B, . . . 101P is determined. The number $s_i$ of spare latches to place within each of the equal sections 101A, 101B, . . . 101P is based on the latch density for each of the equal sections 101A, 101B, . . . 101P and the total number (S) of spare latches available for the integrated circuit design 100. That is, $s_i=l_i*S$. In other words, the latch density $l_i$ of the equal sections 101A, 101B, . . . 101P within the integrated circuit design 100 corresponds to the total number (S) of spare latches that are available to the design (i.e., user 12).

For example, in the integrated circuit design 100 shown in FIG. 4, in equal section 101A, the latch density is ½₀. If, for example, the total number of spare latches that are available for the integrated circuit design 100 is 40, then, for equal section 101A, the number of spare latches is 2. This way, the spare latch density of equal section 101A matches the latch density of equal section 101A. As clearly seen in FIG. 4, spare latches 110 are placed within the integrated circuit design 100.

Although it is not shown, the center (not shown) of each of the equal sections 101A, 101B, . . . 101P may be determined and the spare latches 110 may be positioned within the center of the equal sections 101A, 101B, . . . 101P. That way, if any logic within an equal sections 101A, 101B, . . . 101P, where there is dense logic, needs to be repaired and/or updated, the spare latches, which are proximate to the dense logic will be easily accessible to implement the change, without incurring additional timing delays within the integrated circuit design 100.

While shown and described herein as a method and system for spare latch distribution for an integrated circuit, it is understood that aspects of the invention further provide various alternative embodiments. For example, in one embodiment, the invention provides a computer program fixed in at least one computer-readable medium, which when executed, enables a computer system to perform spare latch distribution for an integrated circuit. To this extent, the computer-readable medium includes program code, such as distribution program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as distribution program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for spare latch distribution for an integrated circuit. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to perform spare latch distribution for an integrated circuit as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for spare latch distribution in an integration circuit design, the method comprising:
   using a computer system to:
      receive design data for the integrated circuit design, the design data including a plurality of latches and a plurality of clock domains;
      segment the integrated circuit design into a plurality of equal sections; and
      for each clock domain:
         determine a latch density within each of the equal sections; and
         determine a number of spare latches, based on the latch density, for each of the equal sections; and
         further comprising determining a center of each of the equal sections, and positioning the number of spare latches at the center of each of the equal sections.

2. The method of claim 1, wherein determining the latch density further comprises:
   determining a total number of the plurality of latches; and
   determining a total number of latches within each of the equal sections.

3. The method of claim 1, wherein determining the number of spare latches is further based on a total number of spare latches.

4. The method of claim 3, wherein the total number of spare latches is provided by the design data.

5. A non-transitory computer-readable medium, which when executed, enables a computer system to implement a method for spare latch distribution in an integrated circuit design, the method comprising:
- receiving design data for the integrated circuit design, the design data including a plurality of latches and a plurality of clock domains;
- segmenting the integrated circuit design into a plurality of equal sections; and
- for each clock domain:
  - determining a latch density within each of the equal sections; and
  - determining a number of spare latches, based on the latch density, for each of the equal sections; and
  - further comprising determining a center of each of the equal sections, and positioning the number of spare latches at the center of each of the equal sections.

6. The computer-readable medium of claim 5, wherein determining the latch density further comprises:
- determining a total number of the plurality of latches; and
- determining a total number of latches within each of the equal sections.

7. The computer-readable medium of claim 5, wherein determining the number of spare latches is further based on a total number of spare latches.

8. The computer-readable medium of claim 7, wherein the total number of spare latches is provided by the design data.

9. A computer system, comprising:
- at least one computing device configured to perform spare latch distribution of an integrated circuit design by:
- receiving design data for the integrated circuit design, the design data including a plurality of latches and a plurality of clock domains;
- segmenting the integrated circuit design into a plurality of equal sections; and
- for each clock domain:
  - determining a latch density within each of the equal sections; and
  - determining a number of spare latches, based on the latch density, for each of the equal sections; and
  - further comprising determining a center of each of the equal sections, and positioning the number of spare latches at the center of each of the equal sections.

10. The computer system of claim 9, wherein determining the latch density further comprises:
- determining a total number of the plurality of latches; and
- determining a total number of latches within each of the equal sections.

11. The computer system of claim 9, wherein determining the number of spare latches is further based on a total number of spare latches provided by the design data.

* * * * *